United States Patent [19]

Stecklein et al.

[11] 4,359,355
[45] Nov. 16, 1982

[54] V-BELT

[75] Inventors: Alfred L. Stecklein; Jerome M. Daugherty, both of Littleton, Colo.

[73] Assignee: The Gates Rubber Company, Denver, Colo.

[21] Appl. No.: 278,305

[22] Filed: Jun. 29, 1981

Related U.S. Application Data

[62] Division of Ser. No. 111,419, Jan. 11, 1980, Pat. No. 4,332,576.

[51] Int. Cl.$^3$ .............................................. B29H 7/22
[52] U.S. Cl. ....................................... 156/138; 156/140; 264/250; 264/294; 264/326; 264/347; 425/28 B
[58] Field of Search ............... 156/137, 138, 140, 141; 264/280, 284, 294, 255, 258, 254, 250, 347, 326; 425/28 B, 34 B, 520, 521, 332

[56] References Cited

U.S. PATENT DOCUMENTS

| | | | |
|---|---|---|---|
| 2,336,149 | 12/1943 | Freedlander | 474/262 |
| 3,404,577 | 10/1968 | Zahn | 474/148 |
| 3,464,875 | 9/1969 | Brooks et al. | 474/250 |
| 3,482,004 | 12/1969 | Anderson | 425/28 B |
| 3,856,907 | 12/1974 | Cicognani | 264/254 |
| 3,860,684 | 1/1975 | Vance | 156/140 |
| 4,011,766 | 3/1977 | Waugh | 474/238 |

FOREIGN PATENT DOCUMENTS 743109 1/1956 United Kingdom ................ 474/262

Primary Examiner—Michael W. Ball
Attorney, Agent, or Firm—Curtis H. Castleman, Jr.; H. W. Oberg, Jr.; Raymond Fink

[57] ABSTRACT

A single or multiple strand molded notch V-belt and a method for its production is described. The method is characterized by use of an open-ended mold having rigid transverse notches and longitudinal ribs forming a plurality of mold cavities. The belt has undulating mold-formed notches which In one embodiment carry a fabric facing of a particular design to retard initiation and propagation of undercord cracks during operation of the belt around described sheaves.

22 Claims, 5 Drawing Figures

V-BELT

This is a division of application Ser. No. 111,419, filed on Jan. 11, 1980, now U.S. Pat. No. 4,332,576.

BACKGROUND OF THE INVENTION

This invention relates to notched V-belting which is mold formed, and the open-ended mold curing system associated therewith for the production of both single and multi-strand belts.

Joined multi-strand banded or bandless power transmission belting and drive systems therefore, are known, as shown for instance in U.S. Pat. No. 3,404,577 to Zahn. It is also known to provide these belts with notches in their undercord (compression section) as shown for instance in U.S. Pat. No. 4,011,766 to Waugh. Cure systems for these multi-strand joined belts, or for single strand belts using open-ended presses in which sections of the belt are consecutively cured in a stepwise manner are also known. Entire slabs or sleeves of belting, from which individual belts may later be obtained by cutting and profiling, or grinding, have also been produced stepwise in an open-ended curing process, employing in some cases rigid transversely notched mold extensions to facilitate indexing and alignment of the slab notches.

It is an object of this invention to produce a notched single or multi-strand V-belt whose notches are fully formed in a multi-cavity open-ended mold. It is a further object to produce a single or multi-strand V-belt with a fabric layer provided along the outer surface of undulating molded notches, such that the fabric retards initiation and propagation of cracks while serving to allow the unimpeded compression of the sidewalls of the belts in use, without substantial flexing of the fabric along the edges of the belt where compression is greatest. It is a further object that such fabric promotes release of the belt product from the mold. It is a further object to provide a joined multi-stranded belt having generally sinusoidal shaped notches in the compression section of the belt, which have been mold formed stepwise by a correspondingly shaped rigid mold portion.

SUMMARY OF THE INVENTION

Briefly described, in one aspect the invention pertains to a method for forming a molded notch elastomeric endless power transmission belt in stepwise manner, including the steps of forming a plurality of uncured belt segments individually having a load carrying section sandwiched between a tension and a compression section; adjacently disposing the belt segments, and interconnecting the belt segments with a tie band to form a belt preform; disposing the belt preform between juxtaposed portions of an open-ended mold having rigid transverse notches and longitudinal ribs separating the belt segments, and pressing the mold portions against the belt preform and heating to cure a section of the belt with notches mold formed in the compression section of adjacent belt segments; and advancing the belt preform successively to dispose an uncured section of the belt between the mold portions such that at least one notch mold formed from a previously cured belt section registers in a transverse mold notch, repeating the step as necessary until the belt is cured along its full perimeter.

In another aspect, the invention pertains to the method for simultaneously forming a plurality of single strand molded notch endless power transmission belts using the above method, with the exception that the individual belt segments are separately disposed within individual cavities of a multi-cavity mold provided with rigid transverse notches and longitudinal ribs separating the belt segments.

In another aspect, the invention pertains to an open-end molded joined multiple strand elastomeric endless power transmission belt including a plurality of mold-formed generally V-shaped belt segments individually having a load carrying section sandwiched between a tension and a compression section; a tie band interconnecting the tension sections of the belt segments into a unitary joined belt; and substantially uniformly spaced notches in the compression section of the belt which follow a generally sinusoidal path on the underside of the belt, formed stepwise by a correspondingly shaped rigid mold portion.

In still a further aspect, the invention pertains to a molded notch elastomeric endless power transmission belt including a generally V-shaped trapezoidal body including a load carrying section sandwiched between a tension and a compression section; molded notches formed in the compression section of the belt defining alternating notched depression surfaces and toothed projections and at least one ply of a fabric material following the outer contour of the notches and integral therewith, the fabric extending tranversely across substantially the full lateral extent of the toothed projections while extending laterally across only an intermediate, partial portion of the notch depression surfaces.

BRIEF DESCRIPTION OF THE DRAWINGS

Preferred embodiments of the invention will be illustrated in conjunction with the accompanying drawings, in which like numerals designate like parts, and in which.

PREFERRED EMBODIMENTS OF THE INVENTION

Figure 1:
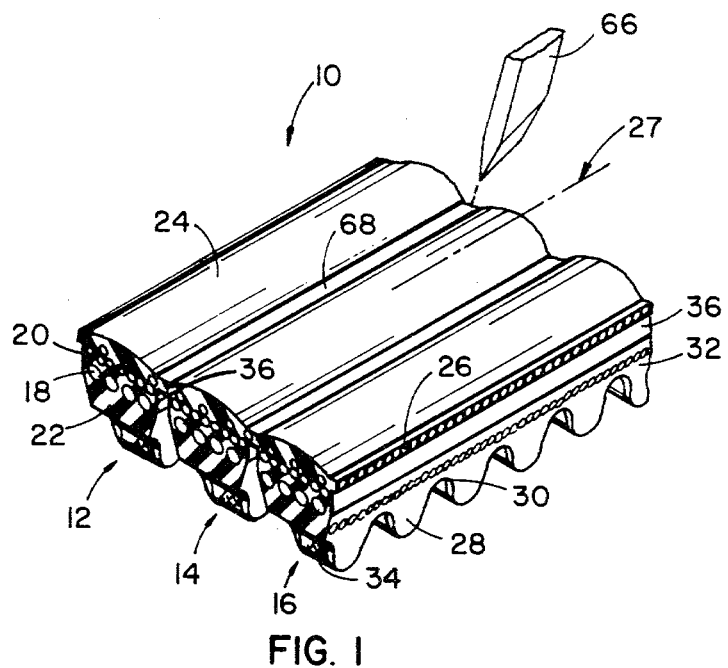
FIG. 1 is a perspective view of a segment of a joined multiple strand endless belt in accordance with the invention.
Figure 2:
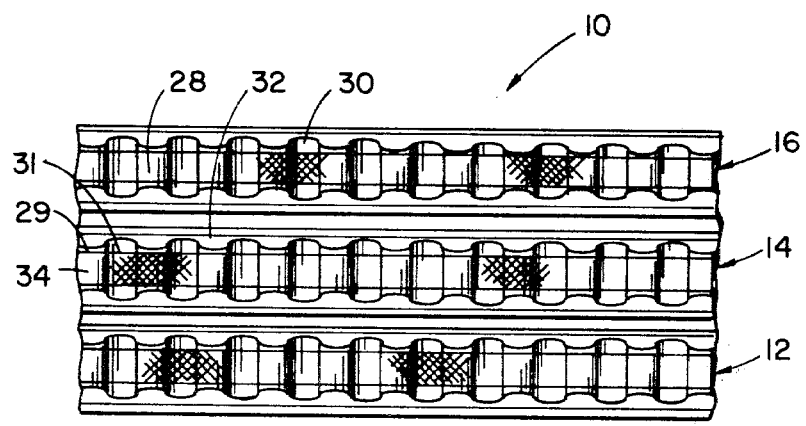
FIG. 2 is an underneath, partial view of the belt of FIG. 1.

Referring first to the belt construction shown generally at 10 in FIGS. 1 and 2, a joined belt connsisting of three strands 12, 14, 16 is shown. Each individual belt segment comprises the usual load carrying section 18 formed, for instance, of spiralled, laterally spaced tensile cord members embedded in elastomeric matrix, a tension or overcord section 20 which may be formed of an elastomeric matrix with or without embedded fiber loading or other reinforcements such as the fabric layer shown, and a compression or undercord section 22, which may also be reinforced similarly to the tension section 20. The materials used for the belt may be the usual rubber or rubber-like stocks, and customary reinforcement or loading materials, calendered fabrics, and the like.

The individual belt segments 12, 14, 16 are joined together in a unitary multi-stranded belt by the common tie band 24. This tie band may be formed of any suitable material, but is preferably an elastomeric matrix of rubber or rubber-like material reinforced with cord or fiber members 26 disposed generally transversely to the longitudinal direction 27 of the belt (which is coincident with its direction of travel about associated sheaves or pulleys). Tire cord or square woven fabric may be used for this purpose, for instance. The angle of the cord or fabric with respect to the axis 27 of the belt may also be varied, as desired.

The compression section 22 of the belt includes transversely disposed notches defined by alternating notch depression surfaces or troughs 30 and toothed projections 28. These alternating notched depression surfaces and toothed projections preferably follow a generally sinusoidal path as shown, which serves to distribute and minimize bending stresses, and to provide a continuously curved notch ramp surface which aids in achieving alignment between the belt and notches of the mold in carrying out the method of the invention.

While each of the individual belt segments 12, 14, 16 may carry an outer band ply or plies of fabric or the like as a wear resistant layer on the sidewalls 32 as well as the notched undersurface of the belt, it is preferred for a number of applications to use bandless (i.e., cut edge) belt segments carrying a relatively thin fabric layer 34 along the undulating notched surface. This fabric layer 34, which may carry a skim layer of elastomer thereon, serves to retard initiation and propagation of cracks in the compression section of the belt resulting from bending stresses as the belt operates about the driver and driven sheaves. It has been found that this fabric layer, which may consist of one or more plies, of high crimp nylon for instance, should follow the contour of the notches as shown particularly in FIG. 2, with the fabric extending transversely across substantially the full lateral extent of the toothed projections 28 as shown at 29, while extending laterally across only an intermediate partial portion as shown at 31 of the notched depression surfaces 30. In this manner, the outer extent 31 of the fabric layer 34 along the notched depression surfaces 30 is spaced substantially from the adjacent sidewall surfaces 32 of the V-belt, particularly at the apex of the notches. This lateral or side spacing is believed to allow the sidewall 32 of the belt, particularly along the medial portion thereof in the vicinity of the apices of the notches, which is subjected to the highest wedging or sidewall forces, to undergo an unimpeded compression in the sheave, without substantially flexing (compressing) the crack retarding fabric 34, due to the substantial spacing of the fabric from the sidewalls of the belt.

Preferably, at the apex of the notches the spacing of the fabric edges 31 from the sidewalls 32 is such that the width of the fabric is from about 50 to about 90, more preferably from about 65 to about 85 percent of the full width of the notch depression surface (at the apex). Although preferred, the fabric need not be exactly centered along the undulating notch surfaces.

The multi-stranded belt is also preferably provided with a vertical flat portion 36 which, as described in the aforementioned U.S. Pat. No. 3,404,577, accommodates build up of extraneous matter to allow the belt to seat properly and run smoother in the multi-grooved sheave.

In accordance with the method of the invention, raw belt cores may be formed in the usual manner, such as by plying up fabric and elastomeric stocks with or without fiber loading, as the undercord, spiralling tensile member over the undercord section, and plying up the overcord section comprised of fabric and elastomeric stocks, fiber loading, or the like, on a building drum. As is also customary, the slab may alternatively be built inverted for better cord line control. The plied-up slabs may then be cut into individual trapezoidal uncured belt segments 12', 14', 16' as seen in FIG. 5. This may be accomplished by first square cutting the plied-up slabs and then skiving to acquire the shape and material weight needed for proper mold cavity fit. Once the individual cores are formed, they may be assembled at a separate topping machine on multi-grooved pulley sets, or at the curing station on grooved end rolls 38, 40 shown in FIG. 4, whereby the belt segments 12', 14', 16' are adhered to the tie band layer 24'. The resultant belt preform 10' is now ready for the curing operation using the apparatus of FIGS. 4 and 5.

Figure 4:
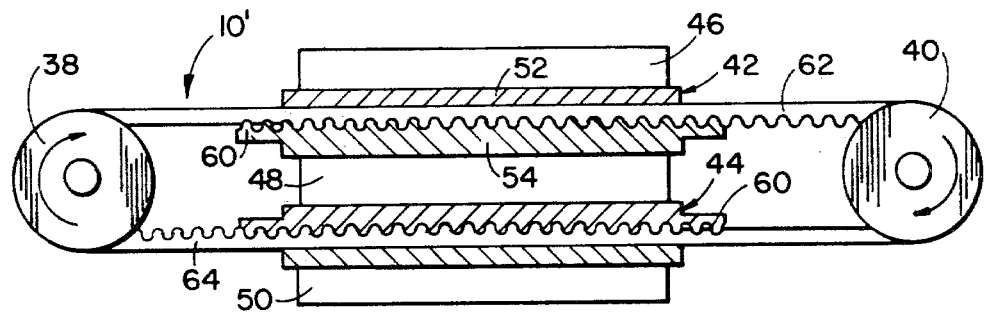
FIG. 4 is a side elevational view of the relevant portions of apparatus employed to perform the method of forming belting in accordance with the invention.
Figure 5:
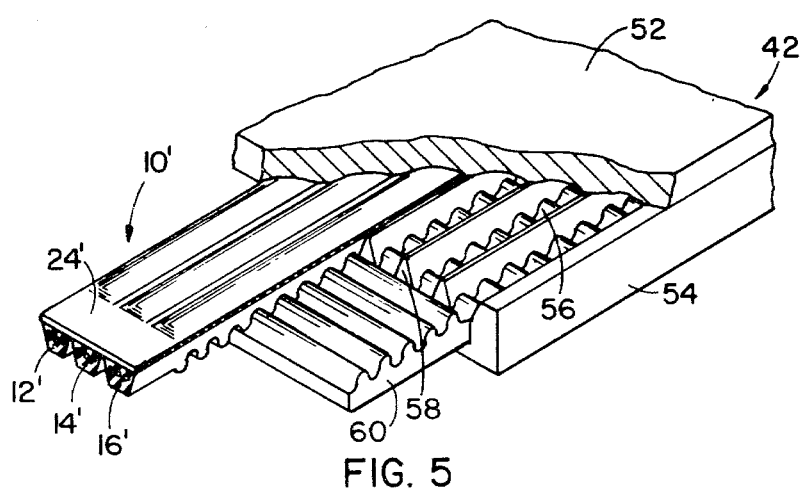
FIG. 5 is a partial, perspective view of a mold employed in the method of the invention, similar to the upper mold portion of FIG. 4, cutaway and illustrating only a portion of the belting being cured.

The belt preform 10' is then positioned as shown in FIG. 4 to be trained about the grooved end rolls 38, 40. Although a single mold section may be used in the open-ended curing system, it is preferred to use an upper section 42 and a lower section 44, sandwiched between the customary press platens 46, 48, 50, which are heated to effect mold forming and vulcanization of the rubber-like matrix of the belt.

Each of the mold sections, such as section 42 as shown in FIG. 5, is composed of a plate 52 configured to produce the desired shape of the top portion of the belting, i.e., the tie band portion, and a lower section 54 having rigid transverse undulating notches 56 and rigid longitudinal V-shaped rib portions 58, which shape the sidewalls 32 of the belt segments and segregate one from another. The mold portion is also preferably provided with extensions 60 (shown longer than in FIG. 4) which serve to help index the belting during successive steps of curing perimetric segments of the belt, as hereinafter described.

With the uncured belt preform 10' positioned about the grooved end rolls 38 and 40, and each of mold sections 42 and 44 closed, with platens 46, 48 and 50 heated, the rubber material of the belt preform is rendered plastic and forced under pressure to conform to the mold notches 56, as bounded by the longitudinal ribs 58, to produce cured belt sections (shown rotated at 62, 64). Each of mold sections 42 and 44 are then opened up and grooved end rolls 38, 40 rotated clockwise whereby these initially cured sections 62, 64 are advanced out of the mold sections and uncured sections of the belting are moved into position for the next successive curing step. This advancing of the cured belt sections 62, 64 is done such that at least the trailing notch which has been mold formed from the previous curing step registers in a transverse mold notch, inclusive of the first notch of the extension portion 60 of the mold. This extension portion also serves to align and index the cured portion of the belt relative to the uncured trailing portion.

The steps of advancing the belt preform are repeated as necessary until the entire uncured portion of the belt has been substantially uniformly cured, along its full perimeter. FIG. 4 shows the belt being cured in the second stage following a first clockwise incremental advancement. On the final cure, there will be four sections of the belt slab which have mold formed notches which must be aligned with the notches of the mold. To achieve alignment, it may be necessary in some cases to slightly adjust the belt length by stretching or shrinking, and this may be done by adjusting slightly the center distance between end rolls 38 and 40. If fiber reinforcement is dispersed in the compression section of the uncured belt segments the ability to align the notches of the belt with the notches of the mold, and to index the belt preform during successive curing of belt sections, is enhanced particularly as a result of the increase in modulus of the belt teeth imparted by the dispersed fibers.

Mold release is greatly enhanced by use of the outer fabric facing 34.

The indexing of the belts during cure can also be done automatically by providing the appropriate equipment for notch alignment sensing, feed back, and belt adjustment.

Figure 3:
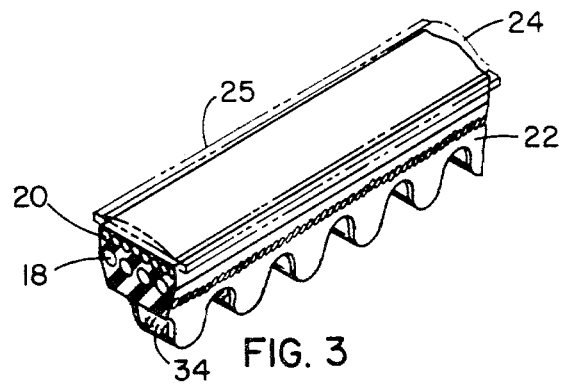
FIG. 3 is a perspective view of a single strand belt in accordance with the invention.

Once the belt is fully cured, the press is opened and the product removed from end rolls 38 and 40. The cured slab may then be slit into multiple strands belts, for instance three strand belts as in FIG. 1, or slit into individual single strand belts as shown in FIG. 3 incorporating the tie band layer 24 (in phantom). A slight overhang portion 25 of the tie band layer may be trimmed flush, if the application requires. The slitting operation may be accomplished using the normal knife cutter 66, as shown in FIG. 1, positioned to slit the individual belts apart along interconnecting portions 68 of the tie band.

Alternatively, the individual skived belt cores 12', 14', 16' may be disposed in the mold of FIG. 5 (modified slightly) without the tie band portion 24', to directly produce individual belts, as depicted in FIG. 3 without the phantom tie band portion 24. Because of the configuration of the mold with transverse notches and longitudinal ribs, which are rigid and formed of metal, the belts may be advanced successively in uniform fashion due to the registration of the corresponding notches of the cured belt into the notch segments of the mold.

The method of the invention has numerous advantages over prior techniques, including reduction in cost by elimination of cured scrap, and elimination of either a grinding step to form the notches or sidewalls or use of a profiled elastomeric matrix to form the notched pattern.

While certain representative embodiments and details have been shown for the purpose of illustrating the invention, it will be apparent to those skilled in the art that various changes and modifications may be made therein without departing from the spirit or scope of the invention.

What is claimed is:

1. A method for forming a molded notch elastomeric endless power transmission belt in stepwise manner, comprising:
    forming a plurality of uncured belt segments individually having a load carrying section sandwiched between a tension and a compression section;
    adjacently disposing the belt segments, and interconnecting the belt segments with a tie band to form a belt preform;
    disposing the belt preform between juxtaposed portions of an open-ended mold having rigid continuously curved transverse notches and rigid longitudinal ribs separating the belt segments, and pressing the mold portions against the belt preform and heating to cure a section of the belt with notches mold formed in the compression section of adjacent belt segments; and
    advancing the belt preform successively to dispose an uncured section of the belt between the mold portions such that at least one notch mold formed from a previously cured belt section registers in a transverse mold notch, repeating this step as necessary until the belt is cured along its full perimeter.

2. The method of claim 1 wherein the completed cured belt comprised of belt segments joined together by the common tie band, is slit longitudinally into two or more individual belts each of which consists of one or more belt segments and its tie band portion unitary therewith.

3. The method of claim 1 wherein a high crimp fabric layer is disposed along the bottomside of the compression section of the uncured belt segments, so that upon molding the fabric is made to follow the contour of the notches formed.

4. The method of claim 3 wherein the fabric does not extend fully laterally across the apices of the notches.

5. The method of claim 1 wherein fiber reinforcement is dispersed in the compression section of the uncured belt segments, to enhance alignment of the notches and indexing of the belt preform during successive curing of belt sections.

6. A method for simultaneously forming a plurality of single strand molded notch endless power transmission belts, comprising:
    forming a plurality of uncured belt segments individually having a load carrying section sandwiched between a tension and a compression section;
    adjacently disposing the belt segments between juxtaposed portions of an open-ended multi-cavity mold having rigid continuously curved transverse notches and rigid longitudinal ribs separating the belt segments, and pressing the mold portions against the belt segments and heating to cure a section of each of the belt segments with notches mold formed in the compression section of adjacent belt segments; and
    advancing the plurality of belt segments together successively to dispose an uncured section of each of the belt segments between the mold portions such that at least one notch mold formed from a previously cured belt section of each belt segment registers in a transverse mold notch, repeating this step as necessary until the belt segments are cured along their full perimeters.

7. The method of claim 1 wherein a high crimp fabric layer is disposed along the bottomside of the compression section of the uncured belt segments, so that upon molding the fabric is made to follow the contour of notches formed.

8. The method of claim 7 wherein the fabric does not extend fully laterally across the apices of the notches.

9. The method of claim 6 wherein fiber reinforcement is dispersed in the compression section of the uncured belt segments, to enhance alignment of the notches and indexing of the belt preform during successive curing of belt sections.

10. A method for forming a molded notch elastomeric endless power transmission belt in stepwise manner, comprising:
    forming a plurality of uncured belt segments individually having a load carrying section sandwiched between a tension and a compression section;
    adjacently disposing the belt segments, and interconnecting the belt segments with a tie band to form a belt preform;
    disposing the belt preform between juxtaposed portions of an open-ended mold having rigid continuously curved transverse notches and rigid longitudinal ribs separating the belt segments, and pressing the mold portions against the belt preform and heating to cure a section of the belt with notches mold formed in the compression section of adjacent belt segments; and advancing the belt preform succesively to dispose an uncured section of the belt between the mold portions such that at least one notch mold formed from a previously cured belt section registers in a transverse mold notch, and upon disposing the last uncured section of the belt between the mold portions aligning mold formed notches of the belt adjacent such last uncured section with the notches of the mold by adjusting belt length as necessary.

11. The method of claim 10 wherein successive advancement of the belt preform is performed automatically.

12. The method of claim 10 wherein said aligning step is performed automatically by sensing the relative position between the notches of the belt and notches of the mold, feeding back such sensed position to means for adjusting said belt length, and adjusting said belt length in response to such feed back.

13. A method for simultaneously forming a plurality of single strand molded notch endless power transmission belts, comprising:

forming a plurality of uncured belt segments individually having a load carrying section sandwiched between a tension and a compression section;

adjacently disposing the belt segments between juxtaposed portions of an open-ended multi-cavity mold having rigid continuously curved transverse notches and rigid longitudinal ribs separating the belt segments, and pressing the mold portions against the belt segments and heating to cure a section of each of the belt segments with notches mold formed in the compression section of adjacent belt segments; and advancing the plurality of belt segments together successively to dispose an uncured section of each of the belt segments between the mold portions such that at least one notch mold formed from a previously cured belt section of each belt segment registers in a transverse mold notch, and upon disposing the last uncured section of each of the belt segments between the mold portions aligning mold formed notches of the belt segments adjacent such last uncured section of the belt segments with the notches of the mold by adjusting belt segment length as necessary.

14. The method of claim 13 wherein successive advancement of the belt segments is performed automatically.

15. The method of claim 13 wherein said aligning step is performed automatically by sensing the relative position between the notches of the belt segments and the notches of the mold, feeding back such sensed position to means for adjusting said belt segment length, and adjusting said belt segment length in response to such feed back.

16. The method of either of claims 10 or 13 wherein fiber reinforcement is dispersed in the compression section of the uncured belt segments, to enhance alignment of the notches and indexing of the belt preform during successive curing of belt sections.

17. A method for forming a molded notch elastomeric endless power transmission belt in stepwise manner, comprising:

forming a plurality of uncured belt segments of generally trapezoidal shape individually having a load carrying section sandwiched between a tension and a fiber-reinforced compression section;

adjacently disposing the belt segments, and interconnecting the belt segments with a tie band to form a belt preform;

disposing the belt preform between juxtaposed portions of an open-ended mold having rigid generally sinusoidal shaped transverse notches, with the sinusoid defining inclined notch ramp surfaces, and rigid longitudinal ribs separating the belt segments, and pressing the mold portions against the belt preform and heating to cure a section of the belt with notches mold formed in the compression section of adjacent belt segments, the notches having been formed by respective displacement of portions of the compression section of the belt preform toward and away from the load carrying section of the preform into conformance with the notch surface of the mold; and advancing the belt preform successively to dispose an uncured section of the belt between the mold portions such that at least one notch mold formed from a previously cured belt section registers in a transverse mold notch as the inclined ramp of the sinusoidal notch surface of the mold contacts a ramp surface of a previously cured belt section and registers therewith.

18. The method of claim 17 wherein upon disposing the last uncured section of the belt between the mold portions, the additional step of aligning mold formed notches of the belt adjacent such last uncured section with the notches of the mold by adjusting belt length as necessary, and by causing said respective inclined ramps of the belt and mold portions to make contact and cause registration of the respective notch surfaces.

19. The method of claim 18 wherein said aligning step is performed automatically by sensing the relative position between the notches of the belt and notches of the mold, feeding back such sensed position to means for adjusting said belt length, and adjusting said belt length in response to such feed back to effect registration.

20. A method for simultaneously forming a plurality of single strand molded notch endless power transmission belts comprising:

forming a plurality of uncured belt segments of generally trapezoidal shape individually having a load carrying section sandwiched between a tension and a fiber-reinforced compression section;

adjacently disposing the belt segments between juxtaposed portions of an open-ended multicavity mold having rigid generally sinusoidal shaped transverse notches, with the sinusoid defining inclined notch ramp surfaces, and rigid longitudinal ribs separating the belt segments, and pressing the mold portions against the belt segments and heating to cure a section of each of the belt segments with notches mold formed in the compression section of adjacent belt segments, the notches having been formed by respective displacement of portions of the compression section of the belt segments toward and away from the load carrying section of the preform into conformance with the notch surface of the mold; and advancing the plurality of belt segments successively to dispose an uncured section of each of the belt segments between the mold portions such that at least one notch mold formed from a previously cured belt section registers in a transverse mold notch as the inclined ramp of the sinusoidal notch surface contacts a ramp surface between notches of a previously cured belt section and registers therewith.

21. The method of claim 20 wherein upon disposing the last uncured section of the belt between the mold portions, the additional step of aligning mold formed notches of the belt adjacent such last uncured section with the notches of the mold by adjusting belt length as necessary, and by causing said respective inclined ramps of the belt and mold portions to make contact and cause registration of the respective notch surfaces.

22. The method of claim 21 wherein said aligning step is performed automatically by sensing the relative position between the notches of the belt and the notches of the mold, feeding back such sensed position to means for adjusting said belt length, and adjusting said belt length in response to such feed back to effect registration.

* * * * *